United States Patent
Sano

(10) Patent No.: US 10,590,252 B2
(45) Date of Patent: Mar. 17, 2020

(54) FOAMING ASSISTANT MATERIAL AND FOAM-MOLDING METHOD

(71) Applicant: Kyoraku Co., Ltd., Kyoto-Shi, Kyoto (JP)

(72) Inventor: Takeru Sano, Yamato (JP)

(73) Assignee: Kyoraku Co., Ltd., Kyoto-Shi, Kyoto (JP)

(*) Notice: Subject to any disclaimer, the term of this patent is extended or adjusted under 35 U.S.C. 154(b) by 75 days.

(21) Appl. No.: 15/538,924

(22) PCT Filed: Dec. 18, 2015

(86) PCT No.: PCT/JP2015/085530
§ 371 (c)(1),
(2) Date: Jun. 22, 2017

(87) PCT Pub. No.: WO2016/104372
PCT Pub. Date: Jun. 30, 2016

(65) Prior Publication Data
US 2017/0342231 A1 Nov. 30, 2017

(30) Foreign Application Priority Data
Dec. 22, 2014 (JP) ................................. 2014-258581

(51) Int. Cl.
| B29C 44/34 | (2006.01) |
| C08J 3/22 | (2006.01) |
| C08J 9/00 | (2006.01) |
| C08J 9/04 | (2006.01) |
| C08J 9/06 | (2006.01) |
| C08J 9/08 | (2006.01) |
| C08K 3/34 | (2006.01) |
| C08K 5/13 | (2006.01) |
| C08L 23/04 | (2006.01) |

(52) U.S. Cl.
CPC . *C08J 9/08* (2013.01); *C08J 3/22* (2013.01); *C08J 9/0023* (2013.01); *C08J 9/0038* (2013.01); *C08J 9/0052* (2013.01); *C08J 9/0061* (2013.01); *C08J 9/0066* (2013.01); *C08J 9/04* (2013.01); *C08J 9/06* (2013.01); *C08K 3/34* (2013.01); *C08L 23/04* (2013.01); *C08J 2201/024* (2013.01); *C08J 2203/02* (2013.01); *C08J 2203/18* (2013.01); *C08J 2207/00* (2013.01); *C08J 2300/30* (2013.01); *C08J 2323/06* (2013.01); *C08J 2423/06* (2013.01)

(58) Field of Classification Search
CPC .............................. C08J 3/22; C08J 2201/024
See application file for complete search history.

(56) References Cited

U.S. PATENT DOCUMENTS

| 4,528,155 | A | * | 7/1985 | Elder | B29C 47/02 |
| | | | | | 264/171.19 |
| 2004/0222009 | A1 | * | 11/2004 | Blew | H01B 3/441 |
| | | | | | 174/110 F |
| 2008/0281010 | A1 | * | 11/2008 | Lefas | C08J 9/0028 |
| | | | | | 521/97 |
| 2010/0190878 | A1 | | 7/2010 | Maruyama | |
| 2012/0045603 | A1 | | 2/2012 | Zerafati et al. | |
| 2013/0338246 | A1 | | 12/2013 | Yoshida | |
| 2014/0213676 | A1 | | 7/2014 | Jeong et al. | |
| 2015/0240043 | A1 | | 8/2015 | Yoshida | |
| 2015/0274917 | A1 | | 10/2015 | Jeong et al. | |
| 2016/0208888 | A1 | * | 7/2016 | Nonaka | F16G 1/08 |

FOREIGN PATENT DOCUMENTS

| CN | 101851362 A | * | 6/2010 |
| CN | 102329447 A | | 1/2012 |
| EP | 1 403 027 A2 | | 3/2004 |
| EP | 2 633 967 A1 | | 9/2013 |
| EP | 2684910 A1 | | 1/2014 |
| EP | 2759389 A2 | | 7/2014 |
| EP | 2 803 515 A1 | | 11/2014 |
| JP | 2002-128934 A | | 5/2002 |
| JP | 2003-002998 A | | 1/2003 |
| JP | 2004-323726 A | | 11/2004 |

(Continued)

OTHER PUBLICATIONS

Machine translation of CN-101851362-A obtained from the European Patent Office (dated Dec. 2018).*
International Search Report dated Apr. 19, 2016 filed in PCT/JP2015/085530.
European Search Report for EP Patent Application No. 15872940.0 dated Apr. 16, 2018.
Korean Office Action for corresponding Patent Application No. 10-2017-7018948 dated Nov. 12, 2018.

(Continued)

*Primary Examiner* — Melissa A Rioja
(74) *Attorney, Agent, or Firm* — Troutman Sanders LLP

(57) ABSTRACT

A foaming assistant material and a foam-molding method, which can achieve the functions of a nucleating agent, a dispersant, and the like sufficiently so that the cells can have smaller diameter, the mixing of foreign substances is prevented, and so on, and can produce the high-quality foam-molded article, are provided. The foaming assistant material is kneaded together with a raw material pellet and the mixture is subjected to the foam molding. The foaming assistant material is a pellet obtained by adding inorganic particles, a chemical foaming agent, and a dispersant to a dilution resin. An antioxidant may be added further to the dilution resin. In the foam-molding method, inorganic particles, a chemical foaming agent, a dispersant, and an antioxidant are added to a raw material resin at the same time in a state that the inorganic particles, the chemical foaming agent, the dispersant, and the antioxidant are mixed in advance.

15 Claims, 1 Drawing Sheet

(56) References Cited

FOREIGN PATENT DOCUMENTS

| | | |
|---|---|---|
| JP | 2005-139431 A | 6/2005 |
| JP | 2010-077193 A | 4/2010 |
| JP | 2011-194700 A | 10/2011 |
| JP | 2012-136598 A | 7/2012 |
| JP | 2012-525472 A | 10/2012 |
| JP | 2013-142146 A | 7/2013 |
| JP | 2014-047320 A | 3/2014 |
| KR | 10-2010-0085451 A | 7/2010 |
| WO | 2006/106652 A1 | 10/2006 |
| WO | 2012/121163 A1 | 9/2012 |
| WO | 2014042189 A1 | 3/2014 |

OTHER PUBLICATIONS

EPO Communication issued in corresponding European Patent Application No. 15872940.0 dated Oct. 28, 2019.
EPO Communication issued in corresponding European Patent Application No. 15872940.0 dated Nov. 21, 2019.

* cited by examiner

[FIG.1]
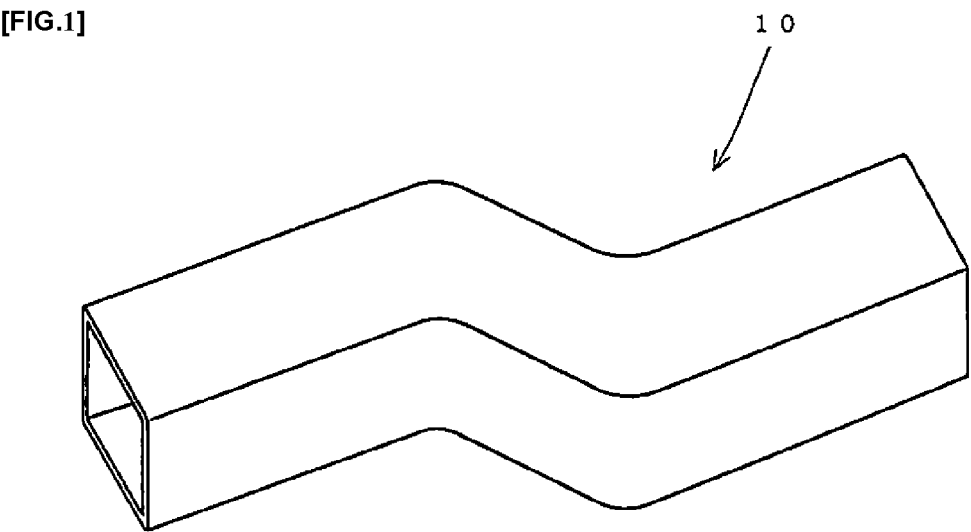
[FIG.2]
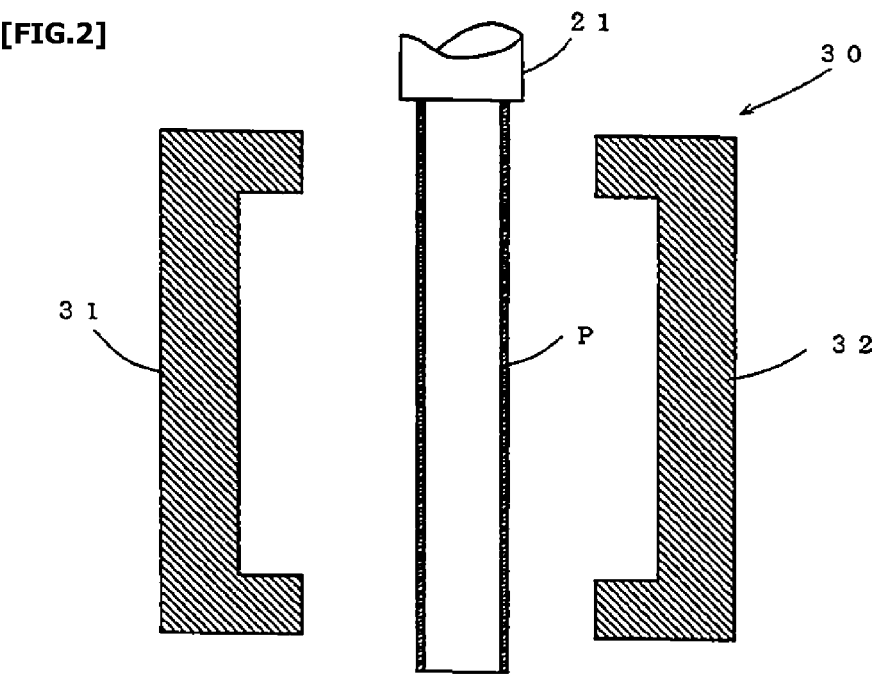

FOAMING ASSISTANT MATERIAL AND FOAM-MOLDING METHOD

CROSS-REFERENCE TO RELATED APPLICATIONS

This is a U.S. national phase application under 35 U.S.C. § 371 of International Patent Application No. PCT/JP2015/085530, filed on Dec. 18, 2015, and claims benefit of priority to Japanese Patent Application No. 2014-258581, filed Dec. 22, 2014. The entire contents of these applications are hereby incorporated by reference.

TECHNICAL FIELD

The present invention relates to a foaming assistant material used in foam-molding. Moreover, the present invention relates to a foam-molding method.

BACKGROUND

Known examples of the molded foam include a climate control duct provided in an instrument panel of a vehicle. The climate control duct often employs a foamed duct formed by molding the foamed resin material. The foamed duct is light in weight. Such a foamed duct can be manufactured easily in a manner that, for example, the resin material such as polyolefin resin including a foaming agent is melted and kneaded and then a foamed parison extruded out of a die of an extruder is blow-molded.

The resin material used for the blow-molded foam is often polyolefin resin. In particular, polypropylene resin is generally used. In recent years, using polyethylene resin alternatively has been examined for the purpose of reducing the material cost (see Japanese Patent No. 2011-194700).

Japanese Patent No. 2011-194700 has disclosed the duct for vehicles, which is obtained by adding a chemical foaming agent to a mixed resin obtained by mixing high-density polyethylene with a long-chain branched structure, a specific gravity of 0.95 to 0.96, a melt flow rate (MFR) of 3 to 7 g/10 minutes, and a melt tensile force of 100 to 250 mN and high-density polyethylene with a melt flow rate (MFR) of 0.3 to 1.0 g/10 minutes, and then blow-molding the resulting mixture.

SUMMARY

Incidentally, in the foam molding to form a foam-molded article, it is preferable to blend a nucleating agent to form a foaming nucleus, and a dispersant to disperse the nucleating agent in a raw material resin. In addition, when the used resin is recycled, for example, it is preferable to blend an antioxidant or the like to suppress the deterioration of the resin in the raw material resin. For example, by blending a chemical foaming agent or inorganic particles as the so-called nucleating agent in the raw material resin, the cells have smaller diameter. The cells having smaller diameter will contribute to the higher cell density and the higher heat insulation properties and higher shock resistance of articles.

In view of this, in the foam molding, it has widely been conducted to blend the chemical foaming agent, the inorganic particles, the dispersant, and the like in the raw material resin. In general, these materials made into pellets individually are mixed into the raw material resin pellet. Specifically, a pellet containing the inorganic particles, a pellet containing the chemical foaming agent, and a pellet containing the dispersant are manufactured in advance. These are mixed with the raw material resin pellet in accordance with the amount of each component, and the mixture is kneaded in a cylinder.

However, making these components into pellets individually and then mixing these pellets into the raw material resin pellet will easily cause the variation in quantity and the unevenness because the amount of nucleating agent and dispersant to be added is very small relative to the raw material resin. These components exert their functions when brought into contact with each other. If these components are added after being made into the individual pellets, their contact is less likely to occur and in this case, the sufficient function of these components may not be obtained. For example, if the dispersant is not brought into contact with the inorganic powder or the chemical foaming agent sufficiently, the dispersion thereof becomes insufficient. In this case, a problem occurs that the cells fail to have sufficiently small diameter or a foreign substance adheres to a peripheral part of a die head or the like. The adhesion of the foreign substance to the apparatus may lead to the mixing of the foreign substance in articles and this may result in the deterioration in article quality.

The present invention has been made in view of the above conventional circumstances. An object of the present invention is to provide a foaming assistant material and a foam-molding method as below. This foaming assistant material can achieve the function of the nucleating agent, the dispersant, and the like sufficiently, reduce the diameter of the cells sufficiently, and prevent the foreign substance from adhering to the apparatus and mixing into articles.

A foaming assistant material according to the present invention for achieving the above objective is a foaming assistant material kneaded together with a raw material resin pellet and subjected to foam molding, where inorganic particles, a chemical foaming agent, and a dispersant are added to a dilution resin.

By adding the inorganic particles and the chemical foaming agent, which function as the nucleating agent, and the dispersant to the same pellet in advance, it is more likely that these components are brought into contact with each other when these components are kneaded with the raw material resin pellet. Therefore, the functions of these components are achieved sufficiently. In addition, the dispersibility of the nucleating agent in the raw material resin is improved and the variation in quantity and the unevenness are suppressed.

On the other hand, a foam-molding method according to the present invention is a foam-molding method for foam-molding a resin material, including adding inorganic particles, a chemical foaming agent, and a dispersant to a raw material resin at the same time in a state that the inorganic particles, the chemical foaming agent, and the dispersant are mixed in advance.

In the foam-molding method according to the present invention, the nucleating agent and the dispersant are added to the raw material resin at the same time in a state that the nucleating agent and the dispersant are mixed. For example, as in the foaming assistant material according to the present invention, the pellet containing the inorganic particles and the chemical foaming agent which function as nucleating agent, and the dispersant is used as a master batch, and the master batch is mixed with the raw material resin. This increases the probability that the components are brought into contact with each other, and the functions of these components are achieved sufficiently. Moreover, the nucleating agent exhibits the higher dispersibility in the raw material resin and the variation in quantity and the unevenness are suppressed.

According to the present invention, since the functions of the nucleating agent, the dispersant, and the like can be exerted sufficiently, the cells can have smaller diameter and the mixing of foreign substances is prevented. Thus, the high-quality foam-molded article can be manufactured. In addition, according to the present invention, the variation in quantity of the added components such as the nucleating agent and the dispersant can be suppressed, for example. Therefore, the foam-molded article without the variation in quality can be provided.

BRIEF DESCRIPTION OF THE DRAWINGS

FIG. 1 is a schematic perspective view illustrating an example of a foamed duct.

FIG. 2 is a schematic sectional view illustrating how to form the duct through the blow-molding.

DETAILED DESCRIPTION

Hereinafter, an example of a foaming assistant material and a foam-molding method according to the present invention will be described in detail with reference to the drawings with an example of the manufacture of a foamed duct.

A foamed duct 10 as a blow-molded foam is configured to let the conditioned air flow from an air-conditioner unit (not shown) to a desired portion along an inner flow path. The shape of the foamed duct 10 is not limited to the shape illustrated in FIG. 1. The shape may be arbitrarily determined in accordance with the intended purpose and the place to install.

The foamed duct 10 can be obtained by having a foamed parison, which is formed by extruding a foamed resin from a die of an extruder, held in a mold and blow-molding the parison. The duct just after the blow-molding has opposite ends closed. After the blow-molding, the opposite ends are cut through trimming, thereby forming the open shape.

The foamed duct 10 includes a hollow foamed resin molded article with a pipe wall formed by a foamed layer. The structure including the foamed layer with a closed cell structure enables to form the duct with the small weight and the excellent heat insulating property. The closed cell structure is the structure including a plurality of closed cells, and refers to a structure having a closed cell content of at least 70% or more. Such a structure hardly allows the dew condensation even if the cool air flows into the foamed duct 10.

In the manufacture of a foam-molded article such as the foamed duct 10, a raw material resin to which a predetermined additive has been added is blow-molded. In the blow-molding, a foamed resin that is foamed using a physical foaming agent is formed. The physical foaming agent may be an inorganic foaming agent such as air, carbonic acid gas, nitrogen gas, and water, or an organic foaming agent such as butane, pentane, hexane, dichloromethane, and dichloroethane. Among these, the foaming agent is preferably air, carbonic acid gas, or nitrogen gas. By using any of these, the mixing of organic matters can be prevented and the decrease in durability or the like can be suppressed.

A foaming method preferably employs a supercritical fluid. That is to say, carbonic acid gas or nitrogen gas in a supercritical state is preferably used to foam the raw material resin. Using the supercritical fluid assures the uniform foaming. If the supercritical fluid is nitrogen gas, for example, the condition may be as follows: the critical temperature is −149.1° C. and the critical pressure is 3.4 MPa. If the supercritical fluid is carbonic acid gas, for example, the condition may be as follows: the critical temperature is 31° C. and the critical pressure is 7.4 MPa.

The thusly foamed raw material resin is blow-molded by a known method, thereby forming the foamed duct 10. FIG. 2 is a diagram illustrating how to form the foamed duct 10 by blow-molding.

In the blow-molding, first, the raw material resin used in the molding is kneaded in an extruder to manufacture a base material resin. The raw material resin may be an arbitrary resin. The effect of the present invention is high when the raw material resin is a polyolefin resin, particularly, a polyethylene resin.

As a polyethylene resin, low-density polyethylene (LDPE), high-density polyethylene (HDPE), linear low-density polyethylene (LLDPE), or the like can be used. A copolymer of ethylene and another copolymerizable monomer may be used. In any case, polyethylene with a long-chain branched structure is preferably included. Using polyethylene with the long-chain branched structure improves the foaming property.

Polyethylene with the long-chain branched structure (hereinafter referred to as long-chain branched polyethylene) is, for example, long-chain branched polyethylene as disclosed in JP-A-2012-136598. Such long-chain branched polyethylene has a branched structure only at a terminal of a long polyethylene chain. Because of this structure, the long-chain branched polyethylene is featured in that the number of branched structures is fewer than that of normal polyethylene.

The long-chain branched polyethylene can be manufactured through ethylene polymerization with a catalyst including an organic aluminum compound and an organic modified clay mineral obtained by modifying clay mineral belonging to smectite group hectorite with a particular organic compound.

The long-chain branched polyethylene may have an arbitrary physical property. For example, the density thereof, which is defined by the value of the density measured based on JIS K7676, is preferably in the range of 925 to 970 kg/m$^3$, particularly preferably 930 to 960 kg/m$^3$. The long-chain branched polyethylene exhibits two peaks in the molecular amount measurement by GPC.

The ratio (Mw/Mn) of the weight-average molecular weight (Mw) of the long-chain branched polyethylene to the number-average molecular weight (Mn) thereof is 2.0 to 7.0, preferably 2.5 to 7.0, and more preferably 3.0 to 6.0. The number-average molecular weight (Mn) measured by GPC is preferably 15,000 or more, more preferably in the range of 15,000 to 100,000, and particularly preferably in the range of 15,000 to 50,000.

The number of long-chain branches of the long-chain branched polyethylene is preferably 0.02 or more per 1000 carbon atoms in the main chain. The number of long-chain branches of the fraction with an Mn of 100,000 or more, which is obtained by the fractionation based on the molecular weight, is 0.15 or more per 1000 carbon atoms in the main chain. The proportion of the fraction with an Mn of 100,000 or more, which is obtained by the fractionation based on the molecular weight, is desirably less than 40% of the entire polymer.

The raw material resin (such as a polyethylene resin) is usually used in the form of a pellet. The raw material resin pellet is input from a hopper of a blow molder and melted and kneaded in a cylinder. Here, necessary additives are input at the same time to be kneaded in the raw material resin. The additives are a dispersant, and inorganic particles and a chemical foaming agent functioning as a nucleating agent.

The inorganic particles and the chemical foaming agent are used to form a foaming nucleus in the raw material resin and function as the nucleating agent. The inorganic particle may be talc, calcium carbonate, or the like. The inorganic particle is preferably talc because, for example, the effect is high and additionally the rigidity can be improved. The preferable chemical foaming agent is an inorganic foaming agent such as sodium hydrocarbonate (baking soda), which is tasteless and odorless and whose cracked residue is nontoxic. As the chemical foaming agent, citric acid, citrate, or the like can be used in combination. In this case, the baking soda or the like is added as a main chemical foaming agent and citric acid or the like is added as an assistant chemical foaming agent.

The dispersant is used to disperse the inorganic particles and the chemical foaming agent uniformly in the raw material resin. The dispersant may be a metal soap or the like. The metal soap is a salt of a long-chain fatty acid and metal other than sodium and potassium. As the metal soap, a stearic acid soap, a hydroxy stearic acid soap, a lauric acid soap, a behenic acid soap, or the like is given.

In the conventional procedure, the inorganic particles, the chemical foaming agent, and the dispersant are made into the individual pellets, the pellets are added to the raw material pellet, and all the pellets are mixed. In the present embodiment, on the other hand, a pellet containing all of these components (foaming assistant material) is manufactured as a master batch, the master batch is mixed with a raw material resin pellet, and the mixture is melted and kneaded.

The pellet (foaming assistant material) used as the master batch is a pellet of a dilution resin containing the inorganic particles, the chemical foaming agent, and the dispersant. One pellet contains the inorganic particles, the chemical foaming agent, and the dispersant. Note that as the dilution resin, an arbitrary resin can be used. The preferable dilution resin is the resin with a lower melting point than that of the raw material resin. For example, if the raw material resin is high-density polyethylene or long-chain branched polyethylene, the dilution resin is LLDPE with high MFR and a low melting point for injection, for example.

In the foam molding, the raw material pellet containing a predetermined amount of the master batch is kneaded in the cylinder of the extruder, and then accumulated in a die accumulator (not shown). Subsequently, after a predetermined amount of resin is accumulated, a ring-shaped piston (not shown) is pushed down in a direction orthogonal to the horizontal direction (i.e., in the vertical direction). Then, from a die slit of an annular die 21 shown in FIG. 2, the resin is extruded at an extrusion rate of, for example, 700 kg/h or more as a cylindrical parison P to the space between split mold blocks 31 and 32 included in a clamping machine 30. After that, the split mold blocks 31 and 32 are clamped to have the parison P held therebetween. In addition, the air is blown into the parison P with a pressure ranging from 0.05 to 0.15 MPa. In this manner, the foamed duct 10 is formed.

The method of molding the foamed duct 10 is not limited to the aforementioned blow-molding. The vacuum molding that vacuums the extruded parison onto the mold to form the article with a predetermined shape may be employed alternatively. Another molding is the compression molding requiring neither the air blowing nor vacuuming but having the extruded parison held between the mold blocks.

In the molding of the foamed duct 10, it is possible that a mixed resin obtained by mixing a recovered resin material and an unused resin (virgin resin) is used as the raw material resin and the foamed blow-molding is performed on the raw material resin to which a foaming agent and the like are added.

A resin molded article is formed by the blow-molding generally in the following manner: a resin material in a melted state is shaped along the mold surface, the resin material cooled and solidified is separated from the mold, and the burr around the molded article and the opening are cut away with a cutter or the like. In the manufacture cycle of the mass production with the blow-molding, the unnecessary part of the resin material that has been melted and solidified around the completed product are pulverized and then collected. The collected resin material is reused from the viewpoint of resource and cost saving. This collected resin material is mixed with virgin resin which has never been heated, so that the mixed resin is provided. A foaming agent or the like is added to this mixed resin and then blow molding is performed again.

In such a manufacture cycle of the mass production, in some cases, the collected resin material constitutes as much as 70 to 90% of the resin material used in the molding. Specifically, for example, after the blow-molding, the collected resin material resulting from the blow-molding is extracted and virgin resin is added to the collected resin material by approximately 10 to 30% relative to the entire resin material of which amount corresponds to the amount extracted for the final foamed and molded article, thereby forming the mixed resin, and in the case of performing the blow-molding again with this mixed resin, the collected resin material constitutes 70 to 90%.

As described above, the manufacture cycle includes preparing the mixed resin by adding the virgin resin to the collected resin material resulted from the blow molding, and blow-molding the mixed resin again. As this manufacture cycle is repeated, the properties of the foamed article (foamed duct 10) formed by molding the mixed resin are often lower than the properties of the foamed article formed by molding the virgin resin only.

In particular, in the case of using the polyethylene resin as the resin material for the foamed duct 10, polyethylene is oxidized to deteriorate due to the thermal history repeatedly applied, resulting in the formation of the crosslinked substance. This leads a major problem that a pin hole detect occurs starting from the nucleus including the crosslinked substance of crosslinked polyethylene in the blow-molding. In particular, the defect occurs more remarkably if forming the foamed duct with an expansion ratio (value obtained by dividing the density of the resin by the apparent density including the cells) of 1.5 or more.

In this case, preferably, an antioxidant is added to the raw material resin. The amount of antioxidant to be added here needs to be set so that the polyethylene resin (foam-molded article) contains the antioxidant by 300 ppm or more in total, preferably 500 ppm or more in total. If the antioxidant is contained by less than 300 ppm, the effect is insufficient, which may make it difficult to suppress the crosslinking deterioration over a long period of time.

The antioxidant may be any known antioxidant. Any of various kinds of antioxidants may be used alone or in combination with another. In particular, the combination of particular antioxidants (a phenolic antioxidant and a phosphorous antioxidant) is effective.

The antioxidant includes an antioxidant that operates to capture a radical (first antioxidant), and an antioxidant that decomposes a peroxide (second antioxidant). Examples of the former (first antioxidant) include a phenolic antioxidant and a hindered amine compound (HALS). Examples of the latter (second antioxidant) include a phosphorus antioxidant and a sulfur antioxidant. The resin generates radicals by heat, light, or shear. If the generated radicals are left as they are, the crosslinking deterioration and oxidation deterioration occur and such deterioration results in the lower physical properties. The former (antioxidant that operates to capture a radical (first antioxidant)) operates to capture the generated radical. This operation prevents the crosslinking deterioration and the oxidation deterioration. On the other hand, the latter (antioxidant that decomposes the peroxide (second antioxidant)) operates to decompose the peroxide (radical) generated in the thermal oxidation into alcohol, thereby stopping the chain reaction to deterioration.

However, for example, if only the antioxidant that decomposes the peroxide (second antioxidant) is added, performing the recycle test involving the thermal history increases the melt tensile force MT largely after the thermal history, i.e., the oxidation prevention effect tends to be insufficient. The melt tensile force MT, which is the parameter observed in the oxidation deterioration, is large. That is to say, the pin hole is formed in the molding because of the foreign substance from the oxidation deterioration.

On the other hand, if only the antioxidant (first oxidant) that operates to capture a radical is added, performing the recycling test involving the thermal history results in the lower melt tensile force MT after the thermal history because of the influence from the antioxidant. It has been turned out that the addition in large amount of 500 ppm or more leads to a problem of lower melt tensile force MT. The lower melt tensile force MT causes the parison to fail to follow if the blow ratio in the blow molding is high. In this case, the pin hole is easily formed.

On the other hand, by the combination of the first antioxidant and the second antioxidant, the sufficient oxidation prevention effect can be achieved and the change amount of the melt tensile force MT can be minimized by offsetting the decrease in melt tensile force MT, which would occur if only the first antioxidant were added, by the addition of the second antioxidant.

The first antioxidant may be any of the aforementioned phenol antioxidant and hindered amine compound (HALS). The phenolic antioxidant is particularly preferable. The second antioxidant may be, for example, a phosphorus antioxidant or a sulfur antioxidant. The phosphide antioxidant is preferable. The phenolic antioxidant and the phosphorus antioxidant are excellent in practicability because these are easily accessible and stably supplied and have high purity. The phosphorus antioxidant has other features of the excellent resistance against hydrolysis and vaporization. The phenolic antioxidant is effective in improving the resistance of various kinds of resins and elastomers against heat. Since the phenolic antioxidant has high molecular weight, the phenolic antioxidant has features of low extraction and low vaporization.

As described thus, using the phosphorus antioxidant and the phenolic antioxidant in combination provides the additional effect. This can effectively suppress the crosslinking deterioration and the oxidation deterioration of the polyethylene resin, and moreover suppress the change in melt tensile force MT and the like in the recycling.

The phosphorus antioxidant and the phenolic antioxidant may be any known antioxidant. For example, the phosphorus antioxidant includes a high-molecular phosphorus antioxidant and a low-molecular-weight phosphorus antioxidant. Any one of them may be used alone, or both may be mixed to be used.

Specific examples of the high-molecular phosphorus antioxidant include tris(2,4-branched C3-8alkyl-butylphenyl) phosphite (such as tris(2,4-di-t-butylphenyl)phosphite), and tetrakis (2,4-di-branched C3-8alkylphenyl)-4,4'-C2-4alkylene phosphite such as tetrakis(2,4-di-t-butylphenyl)-4,4'-biphenylene phosphite. An example of the commercial high-molecular phosphorus antioxidant is a product "Irgafos168" of CIBA JAPAN.

Examples of the low-molecular-weight phosphorus antioxidant include triphenyl phosphite, diphenyl isodecyl phosphite, phenyl diisodecyl phosphite, tris(nonylphenyl) phosphite, and phosphine compounds such as tri-2,4-dimethylphenyl phosphine, tri-2,4,6-trimethylphenyl phosphine, tri-o-tolyl phosphine, tri-m-tolyl phosphine, tri-p-tolyl phosphine, tri-o-anisyl phosphine, and tri-p-anisyl phosphine.

The phenolic antioxidant includes a high-molecular phenolic antioxidant and a low-molecular-weight phenolic antioxidant. Any one of them may be used alone, or both may be mixed to be used.

An example of the high-molecular phenolic antioxidant is a hindered phenol compound. Examples of the hindered phenol compound include tris(2-alkyl-4-hydroxy-5-branched C3-8alkylphenyl)butane such as 1,1,3-tris(2-methyl-4-hydroxy-5-t-butylphenyl)butane, tris(3,5-di-branched C3-8alkyl-4-hydroxybenzyl)benzene such as 1,3,5-trimethyl-2,4,6-tris(3,5-di-t-butyl-4-hydroxybenzyl) benzene, 1,3,5-trialkyl-2,4,6-tris(3,5-di-branched C3-8alkyl-4-hydroxybenzyl)benzene such as 1,3,5-trimethyl-2,4,6-tris(3,5-di-t-butyl-4-hydroxybenzyl)benzene, tetrakis[alkylene-3-(3,5-di-branched C3-8alkyl-4-hydroxyphenyl)propionate]C1-4alkane such as tetrakis[methylene-3-(3,5-di-t-butyl-4-hydroxyphenyl)propionate]methane, and pentaerythrityltetrakis[3-(3,5-di-branched C3-8alkyl-4-hydroxyphenyl)propionate] such as pentaerythrityltetrakis[3-(3,5-di-t-butyl-4-hydroxyphenyl)propionate]. An example of the commercial high-molecular phenolic antioxidant is a product "Irganox1010" of CIBA JAPAN.

Examples of the low-molecular-weight phenolic antioxidant include: monophenolic compounds such as dibutylhydroxytoluene (BHT), butylated hydroxy anisole (BHA), 2,6-di-t-butyl-p-cresol, 2,6-di-t-butyl-4-ethylphenol, 2,6-di-t-butylphenol, 2,4-dimethyl-6-t-butylphenol, 2-methyl-4,6-di-nonylphenol, butylhydroxyanisole, styrenated phenol, 2,4,6-tri-t-butylphenol, and 4,4'-dihydoxydiphenyl; bisphenolic compounds such as 2,2'-methylenebis(4-methyl-6-t-butylphenol), 2,2'-methylenebis(4-ethyl-6-t-butylphenol), 4,4'-butylidenebis(3-methyl-6-t-butylphenol), 4,4'-butylidenebis(2,6-di-t-butylphenol), 1,1'-bis(4-hydroxyphenyl) cyclohexane, and 2,2'-dihydroxy-3,3'-di(α-methylcyclohexyl)-5,5'-dimethyldiphenylmethane; hydroquinone compounds such as 2,5-di-t-butylhydroquinone, hydroquinone monomethylether, and 2,5-di-(tertiary amyl)hydroquinone; and hindered phenolic compounds such as n-octadecyl-3-(4'-hydroxy-3',5'-di-t-butylphenol)propionate.

Moreover, the low-molecular-weight phenolic antioxidant includes a metal deactivator such as a hydrazine compound with a hindered phenol structure such as {N,N'-bis[3-(3,5-di-t-butyl-4-hydroxyphenyl)propionyl]hydrazine}.

When the aforementioned antioxidant is added to the raw material resin, preferably, a mater batch containing these is manufactured and then the master batch is mixed with the raw material resin pellet, which is similar to the case of the inorganic particles, the chemical foaming agent, and the dispersant. That is to say, the pellet containing the inorganic particles, the chemical foaming agent, the dispersant, and the antioxidant (foaming assistant material) is manufactured as a master batch, and the master batch is mixed with the raw material resin pellet.

When the pellet containing all of these additive components (foaming assistant material) is used as the master batch, the amount of master batch relative to the raw material resin pellet may be determined in consideration of the amount of each component contained in the pellet (foaming assistant material) and the optimum amount of each additive component in the molding.

For example, it is preferable that the nucleating agents are contained in the following range: the inorganic particles such as talc are contained by 500 to 2000 ppm, the chemical foaming agent (main chemical foaming agent) is contained by 560 to 2240 ppm, and the assistant chemical foaming agent is contained by 440 to 1760 ppm. Thus, the expansion rate and the cell diameter can be optimized. The dispersant is preferably 1000 to 4000 ppm. If the dispersant is contained by less than 1000 ppm, the dispersibility may be insufficient, in which case the inorganic particles are aggregated, for example. On the contrary, if the dispersant is contained by more than 4000 ppm, the effect more than that cannot be expected due to the volatilization or the like.

The amount of phenolic antioxidant and phosphorus antioxidant to be added needs to be set so that the total amount of antioxidants to be included is 300 ppm or more. In addition, the amount of each antioxidant to be added is optimized. Specifically, the amount of phenolic antioxidant to be included is preferably in the range of 250 ppm to 750 ppm. The amount of phosphorus antioxidant to be included is preferably in the range of 250 ppm to 3000 ppm.

The molded foam of the polyethylene resin including the phenolic antioxidant and phosphorus antioxidant in the above range can have the excellent recyclability and moldability. In particular, the change in the physical properties before and after the thermal history (melt tensile force MT and melt flow rate MFR) can be suppressed, which is effective in recycling the polyethylene resin.

Note that, the amount of antioxidant described above corresponds to the amount of antioxidant included in the blow-molded foam as the final product (here, the foamed duct 10). The amount of antioxidant included in the molded foam is, for example, determined by the quantitative analysis based on, for example, a liquid chromatography. The antioxidant is a pure chemical, so that there is a particular holding time (varying depending on the kind of developing medium and column, which is determined based on the standard substance). The area and the height of the peak are in proportion to the concentration. Thus, the concentration can be known if the calibration curve is formed with the standard sample in advance. In the case of the phenolic antioxidant and the phosphorus antioxidant, the molded foam as the final product includes the antioxidants in the same amount as the amount thereof added in the manufacture.

On the other hand, it is preferable that the components of the pellet (foaming assistant material) used as the mater batch are contained in the following range: the phenolic antioxidant is contained by 1.25 to 3.75 mass %, the phosphorus antioxidant is contained by 3.00 to 15.00 mass %, the inorganic particles are contained by 5.00 to 10.00 mass %, the main chemical foaming agent is contained by 2.80 to 11.20 mass %, the assistant chemical foaming agent is contained by 2.20 to 8.80 mass %, the dispersant is contained by 5.00 to 20.00 mass %, and the dilution resin is contained by 31.25 to 80.75 mass %.

In the pellet (foaming assistant material) used as the master batch, each component is preferably contained at as high concentration as possible. However, if the dilution resin is contained by less than 31.25 mass %, it is difficult to knead each component into the pellet. On the contrary, if the dilution resin is contained by more than 80.75 mass %, the proportion of the dilution resin in the article may increase and an adverse influence such as the lower physical properties may occur.

As described above, various effects can be obtained by using the foaming assistant material according to the present invention. For example, since the defective dispersion does not occur, the defect caused by the uneven concentration does not easily occur. Moreover, each component of the nucleating agent functions effectively, so that the foamed state in which the cells have the small diameter and are uniform can be obtained. In addition, by putting all the components into one pellet, the dilution resin is used in smaller quantity and the handling property can be improved as compared to the case of adding the components individually. In addition, since the quality control can be performed just by checking the pellet used as the master batch, the quality control becomes easier.

The similar effect can be obtained also in the foam-molding method according to the present invention. In the foam-molding method according to the present invention, the pellet containing the nucleating agent, the dispersant, and the antioxidant is used as the master batch in the preferred embodiment. However, the present invention is not limited to this embodiment and it is only necessary that these components are added at the same time.

The embodiment to which the present invention is applied has been described but the present invention is not limited to the described embodiment. Various changes are possible without departing from the concept of the present invention.

Example

A specific example of the present invention will be described based on experiment results.

Examination on the Optimum Amount of Additive Component

To 50 parts by weight of HDPE [MFR 0.25 g/10 min (measurement condition: 190° C., 2.16 kg) with a density of 0.949 g/cm$^3$] and 50 parts by weight of LDPE [MFR 1.79 g/10 min (measurement condition: 190° C., 2.16 kg) with a density of 0.918 g/cm$^3$], a recycled material (a recovered resin material of resin compositions containing the HDPE and LDPE as main components) was added and the mixture was kneaded, so that a raw material resin was obtained. The raw material resin was blow-molded to form a foamed duct. Note that the raw material resin pellet contained a pellet (foaming assistant material). In this pellet (foaming assistant material), the phosphorus antioxidant ("Irgafos168" of CIBA JAPAN), the phenolic antioxidant ("Irganox1010" of CIBA JAPAN), the main chemical foaming agent (baking soda: particle diameter 64 μm), the assistant chemical foaming agent (citric acid), the inorganic particles (talc or calcium carbonate), and the dispersant (metal soap: magnesium 12-hydroxystearate) were kneaded. The amount of each component is shown in Table 1.

Table 1 shows the amount of each component (added amount) and the cell diameter and expansion rate of the manufactured molded article.

TABLE 1

| | Antioxidant | | Nucleating agent | | | | | | |
| --- | --- | --- | --- | --- | --- | --- | --- | --- | --- |
| | | | Main chemical foaming agent (baking | Assistant chemical foaming agent | Inorganic particles | Inorganic particles | Dispersant Metal | Cell | |
| No. | Phosphorus (ppm) | Phenolic (ppm) | soda) (ppm) | (citric acid) (ppm) | (talc) (ppm) | (calcium carbonate) | soap (ppm) | diameter (μm) | Expansion rate (magnification) |
| (1) | 250 | 600 | 1120 | 880 | 500 | — | 1000 | 90 | 2.8 |
| (2) | 400 | 1200 | 2240 | 1760 | 1000 | — | 4000 | 77 | 2.8 |
| (3) | 500 | 1500 | 1120 | 880 | 2000 | — | 2000 | 85 | 2.9 |
| (4) | 750 | 3000 | 1120 | 880 | 2000 | — | 2000 | 95 | 2.8 |
| (5) | — | — | 1120 | 880 | 2000 | — | 2000 | Oxidative deterioration observed | |
| (6) | 250 | 600 | 1120 | 880 | — | — | 2000 | 212 | 2.2 |
| (7) | 250 | 600 | 1120 | 880 | 2000 | — | — | 122 | 2.8 |
| (8) | 250 | 600 | — | — | 2000 | — | 2000 | 114 | 3 |
| (9) | 250 | 600 | — | — | 5000 | — | 2000 | 57 | 2.6 |
| (10) | 250 | 600 | — | — | — | 5000 | 2000 | 147 | 2.5 |
| (11) | 250 | 600 | 1120 | 880 | — | 1000 | 2000 | 107 | 2.5 |
| (12) | 250 | 600 | — | — | — | 1000 | 2000 | 314 | 1.5 |

As is clear from this table, by mixing these components by optimum amount, the foam-molded articles with a small cell diameter (cell diameter: 100 μm or less) and a high expansion rate (average expansion rate: 2.7 or more) can be obtained (the samples No. 1 to No. 4). In contrast to these, samples not containing at least one of these components have a problem that, for example, the cell diameter is large or the expansion rate is low. As the inorganic particles, adding talc is effective. Calcium carbonate is less effective, because of having the larger cell diameter and the lower expansion rate. In the sample No. 5 not containing the antioxidant, in the case of reusing the pulverized material such as burr, a number of pinholes were observed because of oxidative deterioration and the molding was difficult.

Examinations on Mixing Method

In regard to the sample No. 2 shown in Table 1, a difference depending on the mixing method was examined. The material obtained by adding the pellet containing all the antioxidant, the inorganic particles, the main chemical foaming agent, the assistant chemical foaming agent, and the dispersant to the raw material resin pellet and the material obtained by adding the pellets individually containing the components to the raw material resin pellet were subjected to the foam molding under the same condition, and a difference of the obtained molded articles was examined. The results indicate that the material obtained by adding the pellet containing all the antioxidant, the inorganic particles, the main chemical foaming agent, the assistant chemical foaming agent, and the dispersant to the raw material resin pellet provided the uniform molded article without the unevenness in cell diameter, expansion rate, and the like. In contrast, the material obtained by adding the pellets individually containing the components to the raw material resin pellet provided the non-uniform molded article in which the dispersion of the added components is insufficient, for example.

The invention claimed is:

1. A foaming assistant material comprising a phenolic antioxidant, a phosphorus antioxidant, inorganic particles, a chemical foaming agent, a dispersant, and a dilution resin, wherein the phenolic antioxidant is 1.25 to 3.75 mass % of the foaming assistant material, the phosphorus antioxidant is 3.00 to 15.00 mass % of the foaming assistant material, the inorganic particles are 5.00 to 10.00 mass % of the foaming assistant material, the chemical foaming agent is 2.80 to 11.20 mass % of the foaming assistant material, an assistant chemical foaming agent is 2.20 to 8.80 mass % of the foaming assistant material, the dispersant is 5.00 to 20.00 mass % of the foaming assistant material, and the dilution resin is 31.25 to 80.75 mass % of the foaming assistant material.

2. The foaming assistant material of claim 1, wherein the foaming assistant material can be kneaded together with a raw material resin pellet and subjected to foam molding with a physical foaming agent to form a foamed resin, and wherein the foaming assistant material is prepared by a process comprising adding inorganic particles, a chemical foaming agent, and a dispersant to a dilution resin.

3. The foaming assistant material according to claim 2, wherein said process further comprises adding antioxidants to the dilution resin.

4. The foaming assistant material according to claim 3, wherein a phenolic antioxidant and a phosphorus antioxidant are added as the antioxidants.

5. The foaming assistant material according to claim 2, wherein the inorganic particles are talc.

6. The foaming assistant material according to claim 2, wherein a resin used for the raw material resin pellet is a polyethylene resin.

7. The foaming assistant material according to claim 2, wherein a resin used for the dilution resin has a lower melting point than that of a resin used for the raw material resin pellet.

8. The foaming assistant material according to claim 2, wherein the foaming assistant material is a pellet.

9. A method for foam-molding a resin material comprising
adding the foaming assistant material according to claim 1 to a raw material resin to yield a resin material; and
foaming the resin material with a physical foaming agent.

10. The foam-molding method according to claim 9, wherein the resin material is foamed by foamed blow-molding.

11. A foamed resin prepared by
kneading the foaming assistant material of claim 1 with a raw material resin pellet to obtain a kneaded material, and subjecting the kneaded material to foam molding with a physical foaming agent.

12. The foamed resin according to claim 11, wherein the inorganic particles are talc.

13. The foamed resin according to claim 11, wherein a resin used for the raw material resin pellet is a polyethylene resin.

14. The foamed resin according to claim 11, wherein a resin used for the dilution resin has a lower melting point than that of a resin used for the raw material resin pellet.

15. The foamed resin according to claim 11, wherein the foaming assistant material is a pellet.

\* \* \* \* \*